United States Patent
Ryder

(10) Patent No.: US 10,388,136 B2
(45) Date of Patent: *Aug. 20, 2019

(54) SYSTEM AND METHODS FOR DETECTING, CONFIRMING, CLASSIFYING, AND MONITORING A FIRE

(71) Applicant: Noah Lael Ryder, Rockville, MD (US)

(72) Inventor: Noah Lael Ryder, Rockville, MD (US)

(73) Assignee: Noah Lael Ryder, Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,666

(22) Filed: May 21, 2018

(65) Prior Publication Data

US 2018/0276966 A1 Sep. 27, 2018

Related U.S. Application Data

(63) Continuation of application No. 15/374,781, filed on Dec. 9, 2016, now Pat. No. 10,002,510.

(60) Provisional application No. 62/265,351, filed on Dec. 9, 2015.

(51) Int. Cl.
| | |
|---|---|
| *G08B 17/10* | (2006.01) |
| *G08B 17/12* | (2006.01) |
| *G01J 1/42* | (2006.01) |
| *G08B 17/00* | (2006.01) |
| *G08B 29/18* | (2006.01) |
| *G01J 5/08* | (2006.01) |

(52) U.S. Cl.
CPC ............ *G08B 17/12* (2013.01); *G01J 1/4204* (2013.01); *G01J 5/0846* (2013.01); *G08B 17/00* (2013.01); *G08B 29/183* (2013.01); *G08B 29/188* (2013.01)

(58) Field of Classification Search
CPC ...... G08B 17/12; G08B 17/00; G08B 29/183; G08B 29/188; G01J 1/4204; G01J 5/0846
See application file for complete search history.

(56) References Cited

U.S. PATENT DOCUMENTS

| | | | | |
|---|---|---|---|---|
| 4,321,466 A | * | 3/1982 | Mallory | G01N 21/4785 250/574 |
| 4,757,306 A | * | 7/1988 | Kimura | G08B 17/103 250/565 |
| 4,901,056 A | * | 2/1990 | Bellavia | G08B 29/145 340/12.1 |

(Continued)

*Primary Examiner* — Munear T Akki
(74) *Attorney, Agent, or Firm* — Run8 Patent Group, LLC; Peter Miller

(57) ABSTRACT

One variation of a method for detecting a fire includes: during a first time period: detecting an increase in ambient light intensity and detecting an increase in ambient humidity; responsive to the increase in ambient light intensity and the increase in ambient humidity, detecting a fire event; during a second time period: correlating a decrease in ambient light intensity with an increase in visual obscuration; detecting an increase in ambient air temperature; in response to a magnitude of the increase in visual obscuration remaining below a high obscuration threshold and a magnitude of the increase in ambient temperature remaining below a high temperature threshold, classifying the fire as an incipient fire; and, in response to the magnitude of the increase in visual obscuration exceeding the high obscuration threshold and the magnitude of the increase in ambient temperature exceeding the high temperature threshold, classifying the fire as a developed fire.

17 Claims, 5 Drawing Sheets

(56) References Cited

U.S. PATENT DOCUMENTS

| | | | | |
|---|---|---|---|---|
| 5,523,743 A | * | 6/1996 | Rattman | G08B 29/145 250/205 |
| 7,746,239 B2 | * | 6/2010 | Nagashima | G01N 21/21 250/216 |
| 2003/0020617 A1 | * | 1/2003 | Tice | G08B 17/10 340/600 |
| 2006/0261967 A1 | * | 11/2006 | Marman | G08B 17/103 340/630 |
| 2009/0072981 A1 | * | 3/2009 | Powell | G08B 17/06 340/628 |
| 2011/0057805 A1 | * | 3/2011 | Loepfe | G08B 17/107 340/628 |
| 2013/0069543 A1 | * | 3/2013 | Mohan | G08B 17/12 315/155 |

* cited by examiner

S100

S132 SENSOR CHANNEL — S140

| SENSOR CHANNEL | incipient fire | developing fire | smoldering fire | NUISANCE ALARMS ||||
|---|---|---|---|---|---|---|---|
| | | | | steam | electric heater | burnt toast | cutting torch |
| temperature | small | LARGE | -- | small | small | -- | -- |
| light intensity | small | LARGE | small | -- | -- | small | small |
| huidity | LARGE | LARGE | small | LARGE | -- | -- | -- |
| visual obscuration | small | LARGE | small | LARGE | -- | small | -- |
| CO concentration | small | LARGE | LARGE | -- | -- | small | -- |
| CO2 concentration | small | LARGE | LARGE | -- | -- | -- | -- |
| visual (camera) | small | LARGE | -- | small | -- | small | LARGE |
| heat flux | small | LARGE | -- | -- | -- | -- | -- |
| motion | small | LARGE | -- | small | -- | -- | -- |
| sounds | small | small | -- | -- | -- | -- | small |
| pressure | small | small | -- | LARGE | small | -- | -- |

S110 (points to heat flux)

*FIG. 5*

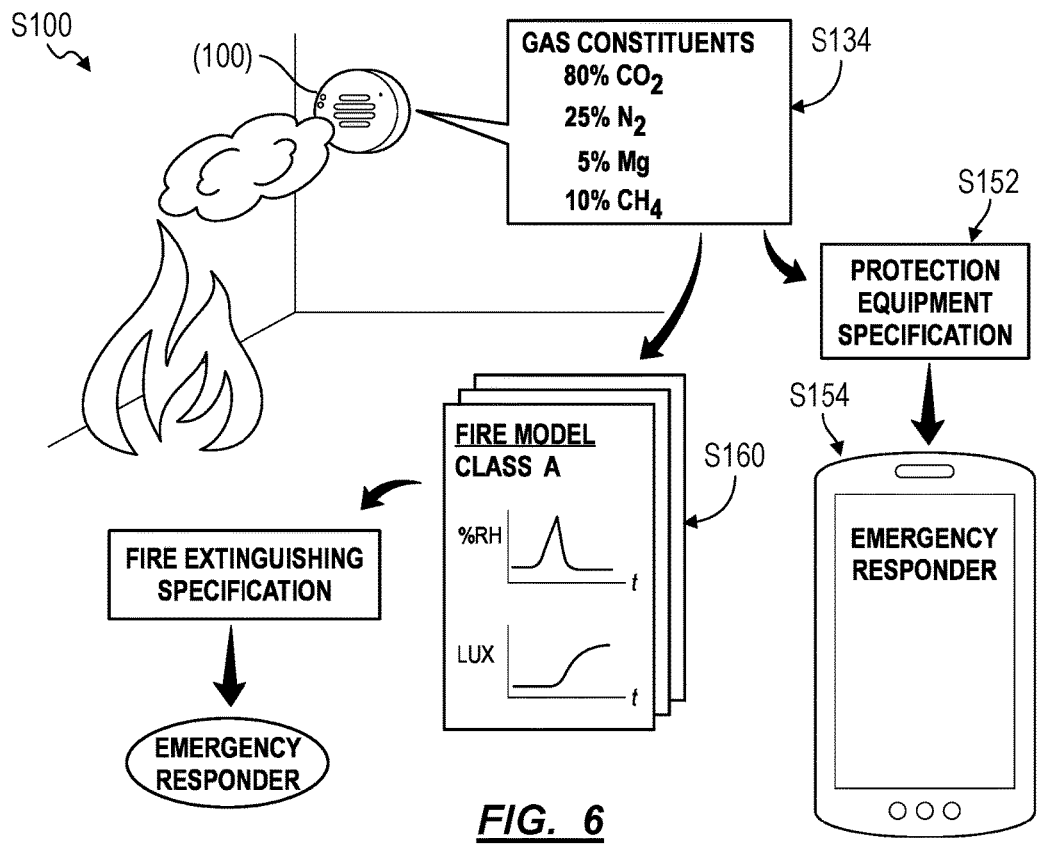

*FIG. 6*

SYSTEM AND METHODS FOR DETECTING, CONFIRMING, CLASSIFYING, AND MONITORING A FIRE

CROSS-REFERENCE TO RELATED APPLICATIONS

This Application is a continuation application of U.S. patent application Ser. No. 15/374,781, filed on 9 Dec. 2016, which claims the benefit of U.S. Provisional Application No. 62/265,351, filed on 9 Dec. 2015, both of which are incorporated in their entireties by this reference.

TECHNICAL FIELD

This invention relates generally to the field of fire detection and more specifically to a new and useful system and method for detecting, confirming, classifying, and monitoring a fire in the field of fire detection.

BRIEF DESCRIPTION OF THE FIGURES

FIG. 5 is a graphical representation of one variation of the method;
FIG. 6 is a flowchart representation of one variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1:
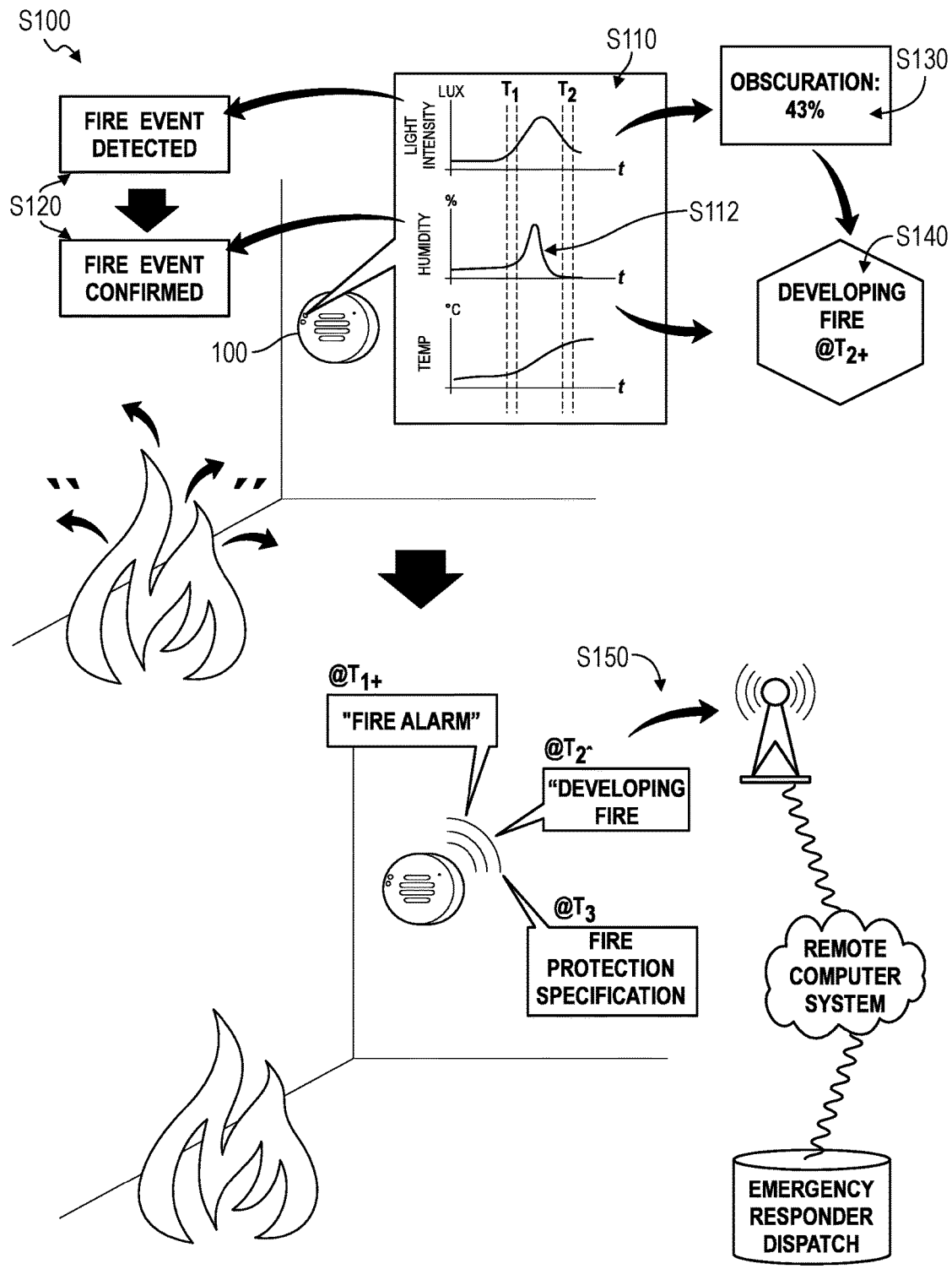
FIG. 1 is a flowchart representation of a method.

As shown in FIG. 1, a method S100 for detecting a fire includes: during a first time period, detecting an increase in ambient light intensity at a light sensor in Block S110 and detecting an increase in ambient humidity in Block S112; based on the increase in ambient light intensity and the increase in ambient humidity during the first time period, detecting a fire event in Block S120; during a second time period succeeding the first time period, correlating a decrease in ambient light intensity detected by the light sensor with an increase in visual obscuration of the light sensor in Block S130 and detecting an increase in ambient air temperature in Block S132; and classifying the fire as one of an incipient fire and a developed fire based on a magnitude of the increase in visual obscuration and a magnitude of the increase in local temperature in Block S140.

Figure 2:
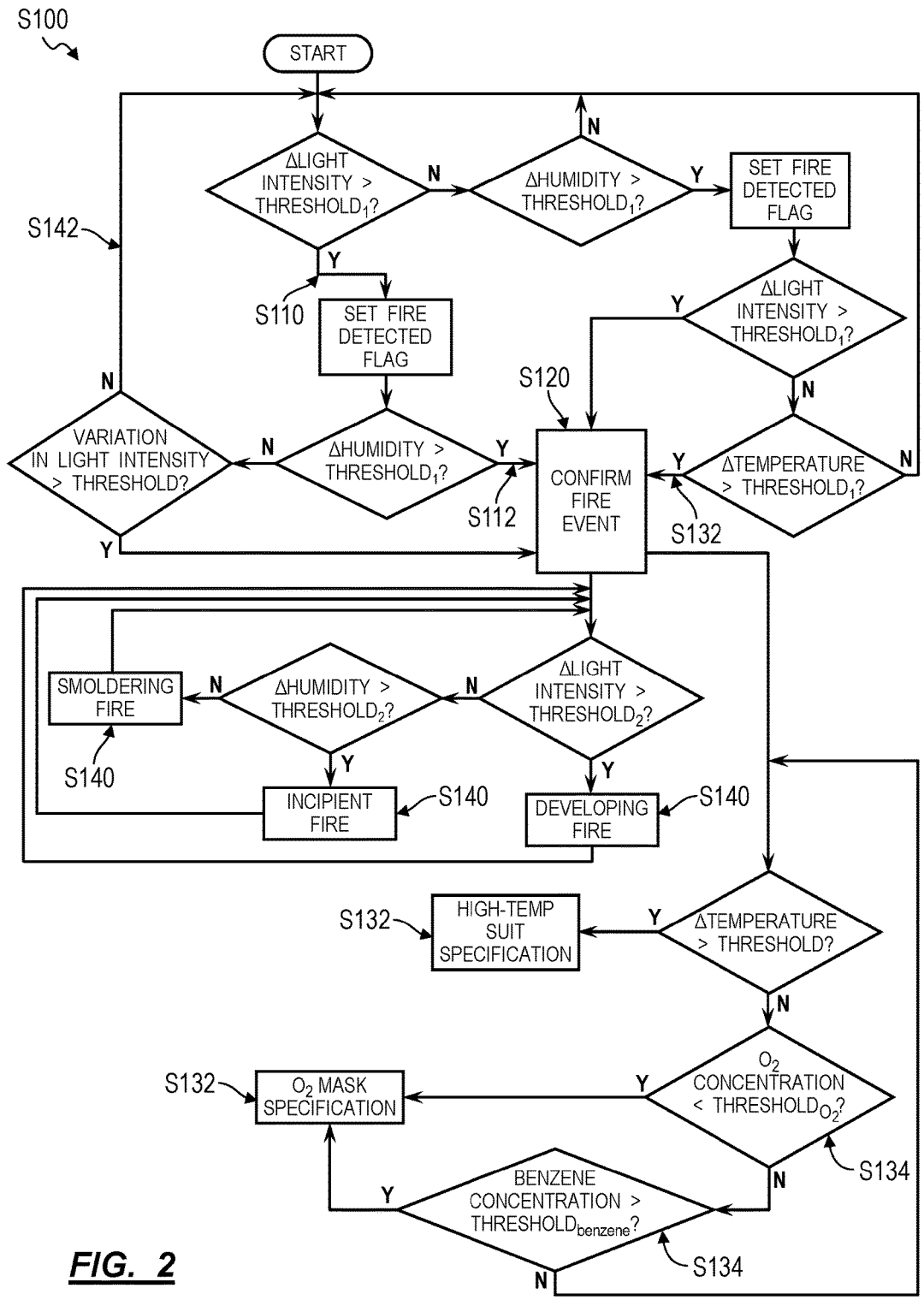
FIG. 2 is a flowchart representation of one variation of the method.

As shown in FIG. 2, one variation of the method S100 includes: at a light sensor, detecting a change in ambient light intensity from an initial intensity to a first intensity at a first time in Block S110, the first intensity exceeding the initial intensity by a threshold light intensity; based on variations in detected local light intensity following the first time remaining within a threshold variation [magnitude], associating the change in ambient light intensity with a lighting change event in Block S142; and based on variations in detected ambient light intensity following the first time exceeding a threshold variation [magnitude], associating the change in local light intensity with a fire event in Block S120.

As shown in FIG. 2, another variation of the method S100 includes: correlating an increase in ambient light intensity within a space with possibility of a fire event in Block S110; confirming the fire event within the space based on an increase in ambient humidity in Block S112; transmitting an alarm to a fire alarm panel, a central station, and/or to an emergency responder in response to confirmation of the fire event in Block S150; detecting a composition of gaseous combustion products within the space in Block S134; generating a protection equipment specification for the fire event based on the composition of gaseous combustion products in Block S152; and transmitting the protection equipment specification to the emergency responder in Block S154.

2. Applications

Generally, Blocks of the method S100 can be executed by an integrated fire detection system (the "system 100") to rapidly detect a possible fire event, to confirm the fire event, to classify the fire once confirmed, to monitor the fire over time, and to supply classification and state data for the fire to an emergency responder. In particular, rather than relying (solely) on plume dynamics to carry smoke and products of combustion from a fire to the system 100, the system 100 can rapidly detect a possible fire event by monitoring outputs of multiple sensors—such as a light sensor and a humidity sensor—and correlating changes in such measured ambient conditions with a possible fire event. The system 100 can reduce Type I ("false positive") errors by confirming a possible fire event determined from data collected by one sensor with data collected by one or more other sensors within the system 100. For example, the system 100 can distinguish fires that warrant an alarm (e.g., incipient fires, developed fires, and smoldering fires) from both non-fire events and nuisance fires (e.g., steam from a teapot, heat from an electric heater, burnt toast, a cutting torch). Following a possible or confirmed fire event, the system 100 can also fuse various data—such as humidity, light intensity, temperature, gas concentration, and motion data collected over time—to determine if the fire is smoldering, incipient, or developing and to monitor the size, position, rate of change, temperature, etc. of the fire over time. Furthermore, the system 100 (or a remote computer system that receives sensor data from the system 100) can transform these fire classification, fire history, and fire trajectory data into prompts or guidance for one or more stakeholders (e.g., occupants, an emergency responder), such as a specification for necessary or recommended safety equipment, evacuation guidance, or methods for handling the fire.

Furthermore, during periods of operation in which a fire is not detected, the system 100 can monitor ambient conditions, such as temperature and humidity, and upload ambient condition data to a local heating and ventilation system (e.g., a thermostat) within the same building; the heating and ventilation system can then modify the output of a heating or cooling system within the building according to these data. During periods of operation during which a fire is not detected, the system 100 can also monitor motion local to the system 100 and can upload these motion data to a security system within the building; the security system can then manipulate these motion data supplied by the system 100 to selectively activate or deactivate an alarm, a camera, etc.

3. Integrated Fire Detection System

Figure 3:
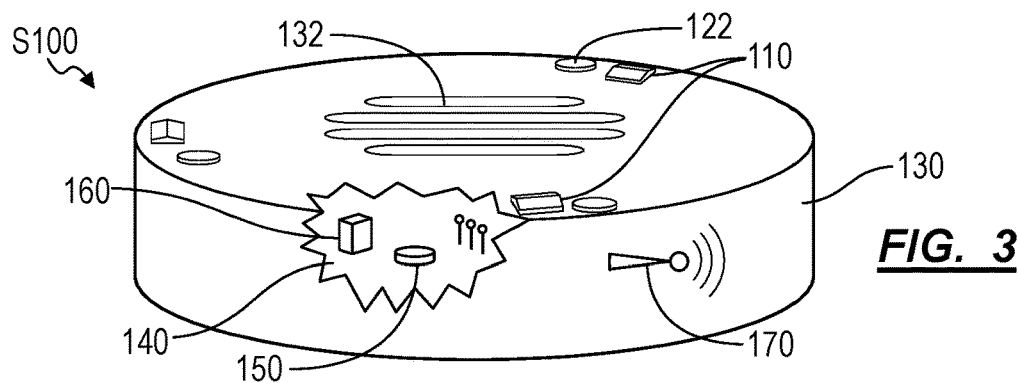
FIG. 3 is a schematic representation of a system.

As shown in FIG. 3, Blocks of the method S100 can be executed locally by an integrated fire detection system (the "system") including multiple sensors.

In one implementation, the system 100 includes a light sensor 110 configured to detect incident electromagnetic radiation, such as in the visible, IR, and/or UV spectrums. In one example, the system 100 includes a full-spectrum light sensor configured to output an analog value corresponding to an intensity of incident light across the visible, IR, and UV spectrums. In another example, the system 100 includes an IR sensor that outputs a value corresponding to an intensity of incident infrared energy. In yet another example, the system 100 includes an RGB light sensor that outputs values corresponding to intensity of discrete, narrow bands of light in the visible spectrum, such as around 640 nm, 532 nm, and 465 nm. The system 100 can also include a combination of two or more types of light sensors. The system 100 can also include a light tube or light pipe aligned with an input side of the light sensor and configured to direct ambient light into the light sensor.

The system 100 can also include a motion sensor 120. For example, the system 100 can include a laser or infrared motion sensor. The system 100 can additionally or alternatively include a distance sensor 122 (e.g., an acoustic or sonar distance sensor); the system 100 can determine a distance between the system 100 and an adjacent surface from a single output of the distance sensor and can compare outputs of the distance sensor over time to detect motion near the system 100. Furthermore, the system 100 can include a pressure sensor, a microphone (or other sound sensor), a heat flux sensor, a light wavelength sensor, and/or a heat color sensor, etc.

In this implementation, the system 100 can include a housing 130 of a heat-resistant material, and the motion sensor and the light tube can be arranged on or near an exterior surface of the housing. For example, the housing can define a short cylindrical structure with mounting features on a first end, and the motion sensor and the light tube can be arranged across the second end with their corresponding fields of view facing outwardly from and substantially parallel to the axis of the housing.

The system 100 can include one or more gas sensors 140, such as one or more sensors configured to detect concentrations of carbon monoxide (CO), carbon dioxide ($CO_2$), oxygen ($O_2$), propane, butane, benzene, sulfur hexafluoride ($SF_6$), and/or hydrogen ($H_2$) in ambient air around the system 100. Similarly, the system 100 can include a humidity sensor 150 configured to detect a concentration of water vapor (e.g., a relative humidity, an absolute humidity) in ambient air around the system 100. Furthermore, the system 100 can include a temperature sensor 160, such as a thermocouple or a thermopile, configured to detect ambient air temperature within the space. In this implementation, the housing can define an internal cavity interposed between two superficial vents 132, and the gas sensor(s), humidity sensor, and temperature sensor can be arranged within the internal housing.

The system 100 can include a wireless communication module 170 (e.g., a Wi-Fi radio, a cellular communication module) configured to broadcast fire-related and environmental data to an emergency responder, a building alarm system, a building security system, and/or a building HVAC system. The system 100 can also include a processor that interfaces with one or more of the foregoing sensors, implements methods and techniques described herein to locally detect, confirm, classify, and monitor a fire, and broadcasts alarm and sensor data via the wireless communication module. The system 100 can be configured to receive power from a building in which the system 100 is installed via a wired power connection, and the system 100 can include a back-up battery. Alternatively, the system 100 can include and can be powered exclusively by an internal battery.

In one variation, the system 100 includes multiple directional sensor sets oriented on or within the housing to collect directional (or regional) data from the space. For example, the housing can define an extruded hexagonal structure with one directional sensor set arranged across each of the 0°, 120°, and 240° faces of the housing, wherein each directional sensor set includes a distance sensor and a light sensor. In this example, the distance and light sensors in each directional sensor set can define fields of view angled outwardly from corresponding surfaces on the housing, such as at an angle of 45° from the axis of the housing to maximize a detectable volume within the space and minimize overlap between sensible volume across the directional sensor sets. The system 100 can thus: determine the distance between the 0°, 120°, and 240° faces and (nearest) opposing surfaces within the space via the distance sensors; for each light sensor, transform a detected light intensity into a light intensity at a light source within the field of view of a light sensor based on the corresponding distance to an opposing surface (as described below); and then triangulate the position of a light source (e.g., a fire) within the space based on the "normalized" light intensities detected at each light sensor in order to determine a more specific position or location of the light source within the space at any time. Similarly, in this variation, the system 100 can track the position of a primary light source (e.g., a fire) in each of three 120° tridrants within the space based on peak (normalized) changes in light intensity detected at each light sensor within the system 100. In this variation, the system 100 can implement methods and techniques described herein for each sensor set (or for a composite sensor image containing data from each sensor set) to detect, confirm, classify, and/or monitor a fire in the field of view of each sensor set.

However, the system 100 can include any other combination of sensors of any other suitable type and arranged on or within a housing of any other material or geometry.

4. Setup

The system 100 can be installed within a structure, such as within a room or hallway within an industrial, commercial, residential, or mized-use structure or within a ship, train, or other vehicle. For example, the system 100 can be installed on a ceiling or on a wall, such as at a standard height of 48" on a wall; as described below, the system 100 can be configured to apply a fire detection and monitoring model based on its installed position. For example, a professional installer can: install the system 100 within a space; access a native system setup application executing on a tablet computer; enter or scan a UUID, serial number, bar code, or other identifier coded into or applied onto the system 100 into the native system setup application; and then enter a room number, a position within the room, a distance between the sensor and an opposing surface (e.g., to a floor for a ceiling installation, to an opposing wall for a wall installation). The native system setup application can pass these system identifying data and installation data to a remote computer system; and the remote computer system can retrieve a fire detection and monitoring model for the system 100 based on these installation data and then route these data directly to the system 100 via a cellular connection based on the system 100 identification data or indirectly through the tablet computer.

Alternatively, once installed, the system 100 can execute an auto-calibration routine to calibrate and/or select a fire detection and monitoring model. In particular, because the intensity of electromagnetic radiation incident on the light sensor (or on the light tube optically coupled to the light sensor) may be a function of the inverse square of the distance between the light sensor and a source of the electromagnetic radiation (i.e., $1/R^2$, wherein R is the distance between the light sensor and the light source), the system 100 can automatically determine its distance from an opposing surface and apply this distance to intensities of detected light in order to estimate a brightness or intensity of a source of the detected light. For example, once installed (and regularly after installation, such as once daily), the system 100 can sample the output of an integrated sonar- or laser-based distance sensor to determine a distance to a nearest surface and can then store this distance as an approximate, single-value calibration distance ("$R_{cal}$") for transforming the detected intensity of incident light ("$I_{inc}$") into a light intensity at a light source ("$I_{source}$") (e.g., according to the formula $I_{source} = c_1 \times I_{inc} \times R_{cal}^2$).

In the variation described above in which the system 100 includes multiple directional sensor sets, the system 100 can implement the foregoing methods and techniques for each directional sensor set. However, the system 100 can be manually configured in any other way or can automatically execute a configure routine to select and/or adjust a fire detection and monitoring model for the system 100's particular installation.

The method S100 is described herein as executed locally by a single unit of the system 100. However, Blocks of the method S100 can be similarly executed across a distributed network of multiple like units of the system 100, such as installed throughout a commercial building, residential building, ship, aircraft, or other structure. Blocks of the method S100 can additionally or alternatively be executed by a central controller (e.g., a local building management program) or a remote computer system (e.g., a remote server) in communication with units of the system 100 of other sensors distributed throughout the building or structure.

5. Fire Detection and Confirmation

The system 100 executes Blocks of the method S100 to detect a possible fire event based on data collected at a first sensor (e.g., the light sensor) and then confirms the fire event based on data collected simultaneously or soon thereafter at one or more other sensors (e.g., the humidity sensor) within the system 100. In particular, for a sensor in the system 100, the system 100 compares outputs of the sensor over a period of time (e.g., a period of several minutes) to identify changes in an ambient condition measured by the sensor. Then, based on a magnitude, rate, and/or frequency of a change in one or more ambient conditions, the system 100 can detect and/or confirm a fire event. The system 100 can therefore track changes in one or more ambient conditions—rather than or in addition to absolute ambient condition values—to detect, confirm, and classify a fire event over time (e.g., such that the sensors need not be calibrated and/or reset over time due to sensor creep).

Generally, as a fire ignites and then develops within a space, the fire may emit electromagnetic radiation (e.g., infrared light) that is first registered—at a first time—by the light sensor as an increase in light intensity over a recent steady-state incident light intensity in Block S110. Based on variations in the intensity of this electromagnetic radiation following the detected increase, the system 100 can confirm that the increased light intensity corresponds to a flame or fire, as in Block S120 described above. With water as a product of combustion, the relative humidity within the space (e.g., a closed, confined space) may initially increase; as moisture from the flame moves within the space and reaches the system 100 at a second time, the humidity sensor can register this increase in humidity over a recent steady-state humidity in Block S112, and the system 100 can apply this detected humidity increase to the previously-detected increase in ambient light intensity to confirm presence of a fire within the space in Block S120. Therefore, in one implementation, the system 100 can detect and confirm a fire event in Block S120 by first detecting an increase in ambient light intensity in Block S110 followed by an increase in ambient humidity in Block S112.

For example, the system 100 can detect a change in ambient light intensity—via its integrated light sensor—from an initial intensity to a first intensity at a first time. The system 100 can then set a fire event flag—indicating that a possible fire event has occurred—at approximately the first time if the first intensity exceeds the initial intensity by a threshold light intensity. The system 100 can then detect an increase in ambient humidity—via its integrated humidity sensor—from the first time to a second time; in response to such an increase in humidity, the system can confirm the fire event flag as a fire event (i.e., confirm that a true fire event indicated by the fire event flag has occurred).

The light sensor may exhibit a limited dynamic range and may therefore not be able to detect both a change in light intensity from a relatively small fire at close range (e.g., a flame at a distance of 1 meter producing less than 10 Watts of light) and a change in light intensity from a larger fire at a greater distance (e.g., a flame at a distance of 3 meter producing less than 100 Watts of light). However, a small fire (or flame) may still release an amount of water vapor that changes the humidity within the space by a magnitude within the dynamic range of the humidity sensor. The system 100 can therefore initially detect such a small fire based on a change in humidity within the space and can then confirm the fire as the flame grows to a size that is detectable by the light sensor. For such small fires, the system 100 can additionally or alternatively detect changes in ambient gas constituents and/or an increase in ambient temperature with the space and fuse these ambient changes with the detected change in ambient humidity to confirm the presence of a small fire (or flame) within the space.

Therefore, during normal operation, the system 100 can sample the humidity sensor and the light sensor (and a limited subset of other sensors integrated into the system 100) and only begin to sample other sensors in the system 100—such as the gas sensor(s) and temperature sensor—once a possible fire event is detected or only once a fire event is confirmed. For example, during normal operation, the system 100: can sample the humidity sensor and the light sensor at a sampling rate of 1 Hz for internal fire detection; and can sample the temperature sensor at a sampling rate of 0.1 Hz and upload temperature data with every tenth humidity datum to a remote HVAC control system. In this example, once a possible fire event is detected or a fire event is confirmed by the system 100, the sensor can sample all samples within the system 100 at a sampling rate of 1 Hz.

In another implementation, the system 100 can detect a possible fire event based on a rapid change (e.g., a step-change) in ambient light intensity and can then confirm or discard the possible fire event based on variations in detected light intensity following the rapid ambient light intensity change. In this implementation, the system 100 can: at a light sensor, detect a change in local light intensity from an initial intensity to a first intensity at a first time in Block S110, wherein the first intensity exceeds the initial intensity by a threshold light intensity; and, based on variations in detected local light intensity—following the first time—remaining within a threshold variation, associating the change in local light intensity with a lighting change event in Block S142. In particular, the system 100 can map a rapid increase (e.g., a step-change increase) in ambient light intensity followed by (near-) steady-state light intensity to activation of an electric light source (e.g., ceiling lights, a desk lamp) within the space. For example, if detected light fluxes over a period of 5 seconds following the light intensity step change event remain within a threshold of +/−2.5% of the peak detected light flux at the light intensity step change event, the system 100 can discard the light intensity step change event as a possible fire event, reset a fire event flag, and continue to search for a subsequent increase in light intensity and/or humidity suggestive of a possible fire event, as in Blocks S110 and S112.

However, in the foregoing implementation, based on variations in detected local light intensity—following the light intensity step change event—exceeding a threshold variation, the system 100 can associate the change in local light intensity with a fire event in Block S120. In particular, the light intensity from a burning fire may vary significantly (e.g., by more than 5% in radiated power) on a multi-second time scale. The system 100 can therefore correlate a large, rapid change in light intensity (e.g., a near-step-change increase of more than 100% in detected light intensity) followed by significant variations of detected light intensity (not characteristic of an electric light source (e.g., varying at 60 Hz), sunlight, or moving cloud cover) with (rapid) onset of a fire. For example, the system 100 can correlate the light intensity step change event with a possible fire event and then confirm the fire event if detected light fluxes over a period of 5 seconds following the light intensity step change event exceed a threshold of +/−2.5% of the peak detected light flux at the light intensity step change event. The system 100 can thus directly correlate a rapid change in incident light intensity followed by a fluctuation in incident light intensity as a fire event. Alternately, the system 100 can set a possible fire event flag based on a light intensity step change followed by significant variations in incident light intensity and then confirm this fire event based on a change in another measured ambient condition within the space, such as humidity or temperature, as described above.

In one implementation, the system 100 can detect and confirm a fire event based on an increase in ambient light intensity followed by a decrease in ambient light intensity. In particular, the onset of a fire can be accompanied by a significant increase in ambient light intensity, which the system 100 can detect via its integrated light sensor. As the fire burns and produces smoke, this smoke may obscure light produced by the fire from reaching the light sensor, thereby yielding a decrease in ambient light intensity detected by the system 100 as the fire burns. The system 100 can therefore associate a decrease in detected light intensity—following an increase in detected light intensity and issuance of a fire event flag—with an increasing presence of smoke (e.g., a high density of smoke near the system 100). For example, the system 100 can: detect a change in ambient light intensity—from a stream of data output by the integrated light sensor—from an initial intensity to a first intensity at a first time; and then set a fire event flag at a first time if the first intensity of ambient light exceeds the initial intensity by a threshold light intensity, as described above. Once the fire event flag is set, the system 100 can continue to track ambient light intensity; if the system 100 then detects an increase in light intensity from the first time to a second time followed by a decrease in light intensity from the second time to a third time, the system 100 can confirm the fire event flag as a fire event, as described above.

However, the system 100 can detect and confirm a fire event based on detected changes in any other one or more ambient conditions over time.

6. False-Positive Rejection

The system 100 can implement similar methods and techniques described above to discard potential fire events as non-fire (or "nuisance alarm") events based on changes in one or more ambient conditions following a detection of a possible fire event. For example, a hot tea kettle may release steam that increases the ambient humidity within a space, but lack of a fire (or a growing fire) within the space may yield no increase in the ambient light within the space; the system 100 can detect a possible fire event based on such a rise in ambient humidity but then discard the possible fire event if no increase in ambient light intensity (and/or if no other change in ambient gas constituents) is detected, as shown in FIG. 5. In another example, a heater may increase the ambient temperature within a space but may not affect ambient light intensity or humidity within the space; the system 100 can detect a possible fire event based on such a rise in ambient temperature but then discard the possible fire event if no increase in ambient light intensity (and/or if no other change in ambient humidity or gas constituents) is detected. However, in this example, the system 100 can update a baseline temperature over time as the heater heats the space. In another example, toast burning in a toaster may create smoke that obscures the light sensor—which reduces light intensity detected by the light sensor—and that contains gas constituents common to fire; the system 100 can detect a possible fire event based on such a change in light intensity and gas constituents but then discard the possible fire event if no increase in ambient humidity and/or temperature is detected soon thereafter.

In one implementation, the system 100 can discard a potential fire event based on a frequency of fluctuation in ambient light intensity. Generally, a burning fire may "flicker" at a rate between 1 Hz and 20 Hz; smoke produced by the fire may also affect transmission of light from the fire to the system 100, thereby yielding fluctuations in detected light intensity at the system 100. Therefore, if a global increase in ambient light intensity—for which the system 100 sets a fire event flag—is accompanied by light intensity fluctuations outside of this range characteristic of a fire, the system 100 can determine that the increase in ambient light intensity was due to a change of state of an innocuous light source and then discard the fire event flag accordingly. For example, if the global increase in light intensity is characterized by light fluctuations in the range of 60 Hz in North America (or 50 Hz in Europe), the system 100 can interpret this increase in ambient light intensity as stemming from an overhead light that was switched on and discard the fire event flag accordingly.

In the foregoing implementation, after detecting a change in ambient light intensity to a first light intensity that exceeds a threshold light intensity at a first time, the system 100 can calculate a frequency of fluctuation in ambient light intensity at a second time following the first time. In response to the frequency of fluctuation in ambient light intensity remaining below a low frequency threshold (e.g., 1 Hz), the system 100 can associate the change in ambient light with a lighting change event suggestive of innocuous ambient light (e.g., sunlight). In response to the frequency of fluctuation in ambient light exceeding the low frequency threshold and remaining above a high frequency threshold (e.g., 40 Hz), the system 100 can associate the change in ambient light with a lighting change event suggestive of activation of artificial lighting (e.g., a fluorescent light being switched on). In response to the frequency of fluctuation in ambient light falling between the low frequency threshold and the high frequency threshold, the system 100 can associate the change in ambient light with an active fire and confirm the fire event flag as a fire event accordingly. The system 100 can thus monitor a possible fire event over time and confirm or discard a fire event flag for the possible fire event as a function of a frequency of fluctuation in detected ambient light intensity.

The system 100 can therefore compare changes across multiple ambient conditions and discard or confirm a fire event accordingly.

7. Fire Classification

Once the fire event is confirmed, the system 100 can map point and time-based data output from the light, humidity, temperature, gas, and/or other internal sensors to a classification of the fire, such as one of a smoldering fire classification, an incipient fire classification, and a developed fire classification, as shown in FIG. 2.

Generally, as the fire continues to burn the intensity of electromagnetic radiation detected by the light sensor may increase from the first time as the fire develops but then decrease as either A) the fire dies or B) smoke from the fire (e.g., a developing or incipient fire) fills space around the system 100 and obscures the light sensor. To distinguish a dying fire from a developing or incipient fire, the system 100 can sample the temperature sensor and then: correlate a minimal temperature increase (e.g., less 10° F. increase) from a detected temperature at the first time with a smoldering (e.g., dying) fire; correlate a moderate temperature increase (e.g., between of 10° F. and 30° F.) from the detected temperature at the first time with an incipient fire; and correlate a large temperature increase (e.g., greater than 30° F.) from the detected temperature at the first time with a developing fire, as shown in FIG. 5. The system 100 can confirm these temperature-based smoldering, incipient, and developing fire classifications based on a magnitude of motion detected by the motion sensor. For example, the system 100 can: confirm that the fire is smoldering if an output of the motion sensor indicates minimal local motion (e.g., less than one output state change at the motion sensor per ten-second interval at a sampling rate of 1 Hz); confirm that the fire is incipient if an output of the motion sensor indicates moderate local motion (e.g., between two and five output state changes at the motion sensor per ten-second interval at a sampling rate of 1 Hz); and confirm that the fire is developing if an output of the motion sensor indicates a high rate of local motion (e.g., more than five output state changes at the motion sensor per ten-second interval at a sampling rate of 1 Hz), as shown in FIG. 5.

In one implementation, following confirmation of a fire event (e.g., based on an increase in ambient light intensity, a frequency of fluctuation in ambient light intensity, and a change in humidity, temperature, etc.), the system 100 can monitor various parameters of the fire event (e.g., humidity, temperature, etc.) over time and classify a state of the fire based on changes in the parameters. In this implementation, after detecting a change in ambient light intensity from an initial intensity at an initial time to a first intensity at a first time, wherein the first intensity exceeds the initial intensity by a threshold intensity indicating a possible fire event, the system 100 can track and calculate a change in ambient temperature from the first time to a second time. In response to the change in ambient temperature from the first time to the second time remaining below a low threshold temperature change, the system 100 can classify the fire event as a nuisance fire. In response to the change in ambient temperature from the first time to the second time exceeding a high threshold temperature change, the system 100 can classify the fire event as a developing fire. Furthermore, in response to the change in ambient temperature from the first time to the second time remaining between the low threshold temperature change and the high threshold temperature change, the system 100 can classify the fire event as an incipient fire.

Figure 4:
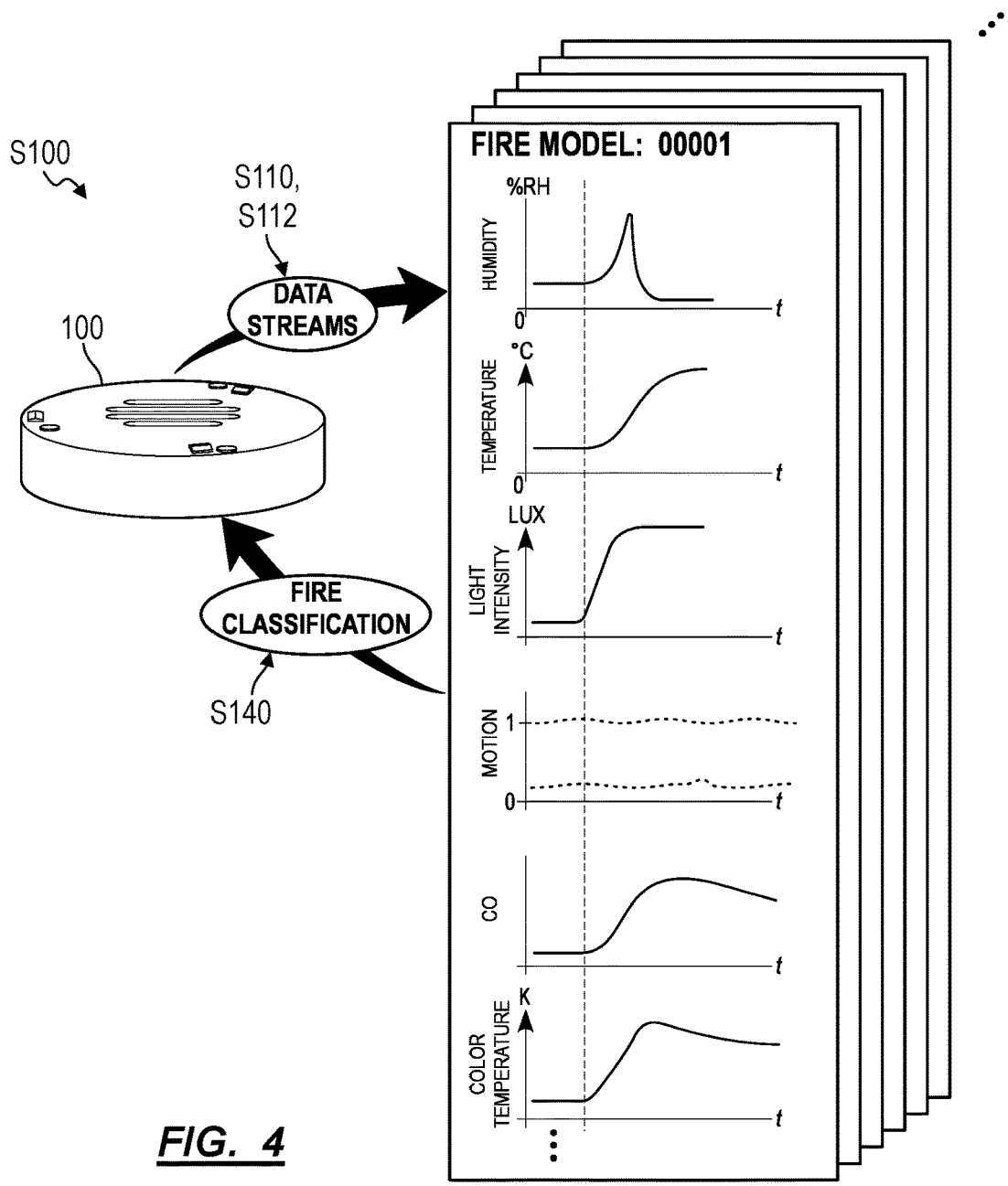
FIG. 4 is a flowchart representation of one variation of the method.

Similarly, the system 100 can monitor a change in ambient humidity following issuance of a fire event flag or confirmation of a fire event, and the system can assign a classification to the fire event as a function of the rate of change in ambient humidity. In particular, as a fire burns, ambient humidity may first increase and then decrease, as shown in FIGS. 1 and 4, as the oxygen in the room is depleted; by tracking ambient humidity following issuance of a fire event flag or confirmation of a fire event, the system 100 can detect this initial increase and subsequent decrease in ambient humidity. In one example, after issuing a fire event flag or confirming the fire event at a first time, the system can: detect an increase in ambient humidity from the first time to a second time; detect a decrease in ambient humidity from the second time to a third time; and calculate a time difference between the third time and the first time (e.g., a duration of time from when ambient humidity began to increase to a time that ambient humidity began to decrease). If this time difference remains below a low time threshold (e.g., ambient humidity rapidly transitions from increasing to decreasing), the system 100 can classify the fire event as a developing fire. If this time difference exceeds the low time threshold and remains below a high time threshold, the system 100 can classify the fire event as an incipient fire. Furthermore, if this time difference exceeds the high time threshold (e.g., ambient humidity slowly transitions from increasing to decreasing), the system 100 can classify the fire event as a nuisance fire (or as representative of a change in an HVAC setting in the building).

In the foregoing implementation, after issuing a fire event flag or confirming a fire event in a room within a building, the system 100 can: monitor ambient humidity in the room and track increases and decreases in ambient humidity while the fire continues to burn. In one example, in response to detecting a 10% increase in the ambient humidity followed by a 20% decrease in the ambient humidity within a two-minute period, the system 100 can classify the fire as an incipient fire. Also in this example, in response to detecting a 15% increase in the ambient humidity followed by a 30% decrease in the ambient humidity within a one-minute period, the system 100 can classify the fire as a developing fire. Similarly, in response to detecting a 5% increase in the ambient humidity followed by no or a minimum decrease in the ambient humidity within a three-minute period, the system 100 can classify the fire as a nuisance fire.

As smoke from the fire reaches the system 100, the system 100 can also detect gaseous constituents of the smoke and map these constituents to a fire classification. For example, because an incipient fire may burn cleaner than both a smoldering fire and a developing fire, the system 100 can map detected concentrations of CO and $CO_2$ below corresponding threshold concentrations to an incipient fire, and the system 100 can map concentrations of CO and $CO_2$ above corresponding threshold concentrations to either a smoldering fire or a developing fire, as shown in FIG. 2.

Furthermore, as a fire burns within a space occupied by the system, smoke produced by the fire or light output by the fire itself can be detected—by a motion sensor in the system 100—as motion. In one example, after issuing a fire event flag or confirming a fire event at a first time, the system 100 can detect a change in total motion level—from the first time to a second time—via the motion sensor. In response to the change in motion level remaining below a low motion threshold, the system 100 can classify the fire event as a nuisance fire. In response to the change in motion level exceeding the low motion threshold but remaining below a high motion threshold, the system 100 can classify the fire event as an incipient fire. Furthermore, in response to the change in motion level exceeding the high motion threshold, the system 100 can classify the fire event as a developing fire. The system 100 can thus monitor a fire event and classify the fire event as a function of motion level or changes in motion level over time.

As the fire continues to burn, the system 100 can repeat the foregoing methods and techniques to reclassify the fire, such as the fire shifts from an incipient fire to a developing fire or from an incipient fire to a smoldering fire.

8. Fire Composition

In one variation of the method S100, the system 100 also tracks ambient gas constituents and maps these ambient gas constituents to a safety equipment callout for an emergency responder. In particular, the system 100 can: detect a composition of gaseous combustion products within the space in Block S134; and generate a protection equipment specification for the fire event based on the composition of gaseous combustion products in Block S152.

In another example, the system 100 can map a continuous rise in ambient temperature and a magnitude of a fall in detected light intensity—following a rise in ambient light intensity—to a density of smoke within the space; the system 100 can set an eye protection and oxygen supply callout for an emergency responder once the smoke density passes a threshold smoke density. However, in this example, if the smoke density remains less than the threshold smoke density, the system 100 can sample one or more internal gas sensors to determine the presence of flammable, noxious, or otherwise dangerous airborne compounds in the space, such as propane, butane, or benzene. In response to detected levels of such compounds exceeding threshold levels, the system 100 can similarly set an oxygen supply callout for the emergency responder. In this example, the system 100 can also set a flag for a high-temperature fire suit once the ambient temperature within the space rises above a threshold temperature.

In this variation, the system 100 can additionally or alternatively transform detected ambient gas constituents into a possible fuel type based on concentrations of various ambient gas constituents. For example, the system 100 can pass ambient gas constituent concentration values into a lookup table to determine if the fuel source is wood, upholstery, paper, a liquid fuel (e.g., gasoline, paint thinner), etc. The system 100 can thus pass this determined fuel type to the emergency responder, as described below. Alternatively, based on the type of fuel source associated with the ambient gas constituents and a value or rate of change in ambient temperature, humidity, light intensity, obscuration, motion, sound, etc., the system 100 can characterize a risk value for the fire event. For example, the system 100 (or the remote computer system receiving sensor data from the system 100 substantially in real-time) can classify the fire event as one of a green ("low-risk"), yellow ("moderate-risk"), or red (high-risk") fire. In another example, the system 100 can rate the fire, such as on a scale of 1-10 based on these factors. The system 100 can thus push these fire risk values to the emergency responder in Block S154, as described below.

8.1 Fire Class

In this variation, in Block S160, the system 100 can assign a class descriptor to a fire event based on characteristics of the fire (e.g., based on sensor data collected at the system following confirmation of the fire event). The system 100 can then map the class descriptor of the fire event to a fire extinguishing equipment callout for an emergency responder. Generally, fires may be assigned different classes based on materials involved in ignition of the fire, such as: Class A fires started with combustible solids such as wood and paper; Class B fires started with flammable gases and liquids; Class C electrical fires involving potentially energized electrical equipment; Class D fires started with flammable metals; and Class K fires started with cooking fats or oils. Each class of fire may require a different type of fire extinguishing device to extinguish. For example, "water fire extinguishers" (i.e., fire extinguishers that dispense water to extinguish fires) may be commonly allocated to commercial and residential buildings but may be suitable only for extinguishing Class A fires. In this example, water fire extinguishers may be dangerous for emergency responders when used on Class C electrical fires. In particular, water dispensed from a water fire extinguisher may conduct electricity from a Class C fire to an emergency responder, which may result in electrocution and/or death of the emergency responder. In another example, Class D (i.e., metal) fires may require dry powder extinguishing materials; and water dispensed from water fire extinguishers may excite Class D fires and cause Class D fires to spread.

In this variation, the system 100 can assign a class descriptor to a fire event based on sensor data collected by the system 100 and known parameter signatures (e.g., humidity, temperature, $NO_X$ gas, and/or carbon dioxide signatures, etc.) of various classes of fires, such as defined in a set of fire templates stored in local memory on the system 100, as shown in FIG. 4. For example, a Class D electrical fire may produce brighter light immediately followed by more smoke but initially burn at a lower temperature than a Class A fire. In another example, a Class A fire may exhibit a greater increase in ambient carbon dioxide than a Class D metal fire.

In one implementation, the system 100 can access a database of fire templates, wherein each fire template is associated with a different fire class and defines a temporal relationship between various characteristics of the fire and time, as shown in FIG. 4. In response to detecting and confirming a fire event, the system 100 can monitor and record the characteristics (e.g., temperature, humidity, light intensity) of the fire over time through various integrated sensors as the fire continues to burn. The system 100 can then compare development of (e.g., changes to) these characteristics of the fire over time to these fire templates, match these characteristics to a particular fire template, and assign a class descriptor associated with the particular fire template to the fire event accordingly. After assigning the class descriptor to the fire event, the system 100 can generate a fire extinguishing equipment callout specifying fire extinguishing equipment required or expected to extinguish the fire based on the class descriptor assigned to the fire event and then serve this fire extinguishing equipment callout to an emergency responder. After matching the fire event to a fire template and assigning the corresponding class descriptor to the fire event, the system 100 can also predict future development of the fire in accordance with the matched fire template and past rates of change of various fire parameters (e.g., humidity, temperature, etc.). For example, the system 100 can predict that the temperature of a Class C fire currently burning at 800° F. may increase until it reaches an ultimate temperature of 1200° F. in eight minutes by mapping rates of change in ambient light intensity, humidity, and temperature to the matched fire template. In this example, the system 100 can then transmit a notification to an emergency responder indicating that additional heat protection equipment will be required upon arrival at the burning building despite the current temperature of the fire being only 800° F.

As shown in FIG. 6, the system 100 can also generate a fire extinguishing callout based on the composition of gaseous combustion products. In particular, the system 100 can transform detected ambient gas constituents detected through sensors in the system 100 into a possible fuel type and correlate the possible fuel type with a fire class, as described above. In this implementation, the system 100 can: determine a combustion source of a fire event based on a composition of gaseous combustion products; generate a fire extinguishing specification for the fire event based on the combustion source of the fire; and transmit the fire extinguishing specification to an emergency responder, as described below. For example, if the system 100 detects trace amounts of magnesium in the gaseous combustion products of a fire event, the system 100 can determine that the fire event is a Class D metal fire and then notify an emergency responder that the fire event requires a dry powder fire extinguisher. Similarly, if the system 100 detects trace amounts of copper in the gaseous combustion products of a fire event, the system 100 can determine that the fire event is a Class C electrical fire.

9. Fire Modeling

In one implementation, the system 100 implements one or more decision trees to confirm a fire event, to determine a fire classification for the confirmed fire event, to generate a protection equipment specification for the fire event, and/or to assess a risk value for the fire event, such as shown in FIGS. 2 and 5.

In another implementation, the system 100 can implement non-parametric techniques, such as template matching, to transform sensor data collected from one or more internal sensors over time into confirmation of a fire event, classification of the fire event, a protection equipment specification, and/or a risk value assessment for the fire event, as shown in FIG. 4. For example, for each sensor channel supported by the system 100, the system 100 can store—in local memory—a set of time-dependent data templates (e.g., images, charts) for each of various fire classifications across various fire sizes, fuel sources, etc. In this example, for the system 100 that includes [a light sensor, an humidity sensor, a temperature sensor, a CO sensor, a $CO_2$ sensor, an oxygen sensor, a volatile gas sensor, and a motion sensor], the system 100 can store time-dependent [light intensity, humidity, temperature, CO, $CO_2$, oxygen, volatile gas, and motion] templates for the duration of each of [an incipient fire, a developing fire, and a smoldering fire] of [small, medium, and large] sizes (e.g., 50 kW, 500 kw, 5 MW power, respectively) for each of a [paper, wood, gas or oil, and upholstery]-type primary fuel source. Therefore, in this example, the system 100 can store 288 time-dependent data templates covering eight sensor channels across 72 characterized fires. For each internal sensor within the system 100, the system 100 can match time-dependent data output by the sensor—such as starting at a detected or confirmed fire event—to a time-dependent data template for the sensor type. Based on a number of sensor data streams that match time-dependent data templates for a template fire, the system 100 can calculate a confidence interval for a template-based classification for a detected fire. The system 100 can also calculate a confidence interval for a template-based classification for a detected fire based on a degree of overlap between sensor data streams and time-dependent data templates. Furthermore, when matching a time-based data stream from a sensor, the system 100 can stretch or compress the data stream in real time in order to fit the sensor stream to a data template for the sensor, and the system 100 can estimate a trajectory or rate of growth of the fire based on a stretch or compression coefficient thus applied to the data stream. The system 100 can similarly stretch or compress a data stream from a sensor along a sensed value axis in order to fit the sensor stream to a data template for the sensor, and the system 100 can estimate a size of the fire based on a stretch or compression coefficient thus applied to the data stream. However, the system 100 can implement any other template matching technique to match sensor data to a corresponding data template to confirm and/or classify a fire.

In another implementation, the system 100 can implement a parametric model—stored locally in memory in the system 100—to detect, confirm, classify, and/or monitor a fire. For example, the system 100 can implement a parametric model that outputs a fire classification and a fire severity value as a function of: time (t) from detection of a possible fire event (or time from a confirmed fire event) (to); changes in humidity, temperature, air composition (e.g., ppm $CO_2$, ppm benzene), and/or light intensity, etc. since to; and/or rates of change in humidity, temperature, air composition, and/or light intensity, etc. over limited time durations (e.g., a past set of four sampling periods); etc. The system 100 can therefore implement a parametric model that transforms changes (and rates of change) in values output by one or more sensors within the system 100 over time into a quantitative and/or a qualitative value representative of the current state of a detected fire.

In the foregoing implementation, a remote computer system: can collect sensor data from similar systems deployed to various spaces; and can then implement (semi-)supervised machine learning techniques to generate the parametric model based on these sensor data and human-supplied feedback pertaining to environment, severity and/or classification of fires measured by these similar systems. The parametric model can be pre-loaded onto the system 100 during its manufacture or can be uploaded to the system 100—such as via the Internet—when the system 100 is installed. The remote computer system can also collect such sensor data from these deployed systems, retrieve fire data supplied by humans (e.g., emergency responders) for fires burning near these deployed system, and refine the parametric model based on these sensor data and human feedback data. The remote computer system can thus continue to refine the parametric model based on additional fire-related data collected from like deployed systems over time and can automatically push updated parametric models to new and remaining systems in deployment. (In the previous implementation, the system 100 can implement similar techniques to generate and/or refine data templates for sense channels supported by the system 100 based on additional data collected from deployed systems over time and to push new or refined data templates to systems remaining in deployment.)

However, the system 100 can implement any other method or technique to transform data collected from various sensors within the system 100 into detection of a fire, confirmation of a fire, classification of a fire, etc.

In one variation, the system 100 implements a decision tree, data templates, and/or a parametric model based on the installation configuration of the system 100. For example, when an installer installs the system 100 in a space, the installer can indicate whether the system 100 is installed on a wall or on a ceiling through native system setup application, as described above; the remote computer system can select a wall-specific or ceiling-specific decision tree (or set of data templates, parametric model) for the system 100 accordingly and then automatically push the selected decision tree to the system 100. In this example, the installer can also indicate: whether the system 100 is installed on a wall or on a ceiling; whether the system 100 is installed in the center of the ceiling or in a corner of the ceiling of a space; a size (e.g., length, width, ceiling height) of the space; and/or a common construction material within a space (e.g., wood, concrete, sheetrock, wool carpet); etc., and the remote computer system can select a decision tree (or set of data templates, parametric model) specific to a combination of one or more of the foregoing installation parameters and the installation configuration of the system 1000. In a similar example, the system 100 can include a tilt sensor or an accelerometer, can determine its installation orientation based on an output of the tilt sensor or accelerometer, and can automatically retrieve a decision tree (or set of data templates, parametric model) specific to its installation configuration. However, the system 100 and/or the remote computer system can select a particular decision tree, set of data templates, or parametric model for the system 100 based on any other one or more installation parameters.

10. Alarms and Communications

Generally, in Block S150, the system 100 functions to transmit an alarm to an emergency responder in response to confirmation of a fire event. For example, in response to confirmation of a fire, the system 100 can upload a fire alarm directly to an emergency responder dispatch or to a remote computer system that distributes a fire alarm to an emergency responder dispatch. In this example, the system 100 can transmit fire alarm data over short- or medium-range wireless communication protocol, such as over Wi-Fi, or over long-range wireless communication protocol, such as over a cellular connection. When a detected fire is confirmed, the system 100 can also broadcast a fire alarm to an alarm system integrated into the space in which the system 100 is installed, and the integrated alarm system can issue an audible and/or visual alarm within the space.

In one implementation, the system 100 transmits a communication or notification of a fire event to an occupant of the building, to a building operator or engineer in the building, or to an emergency responder during and/or after a fire event, such as through an operator portal executing on or accessible through a desktop or mobile computing device. The system 100 can also transmit notifications of different types to various stakeholders affiliated with the building at different times throughout the duration of a fire event. For example, the system 100 can: transmit a first notification indicating possibility of fire to a building operator (e.g., to an engineering portal executing on a desktop computer within the building) after setting a fire event flag at a first time; transmit a second notification indicating confirmation of the fire event to the building operator and to an emergency responder (e.g., to a dispatcher portal executing on a desktop computing device at an emergency dispatcher) in response to confirming the fire event flag at a second time based on data collected following the first time; and then transmit a third notification indicating a fire classification to the emergency responder after classifying the fire event at a third time based on data collected following the second time. In this example, the system 100 can also: transmit a fire alarm to a building operator to prompt the building operator to immediately contain and extinguish a fire in response to classifying a fire event as an incipient fire; transmit a fire alarm to an emergency responder prompting response to a fire at the building and transmit a notification to evacuate the building to the building operator and/or other occupants of the building in response to classifying the fire event as a developing fire; or discard a fire event in response to classifying the fire event as a nuisance fire and then serve an audible notification through an audio system arranged in the building to extinguish the nuisance fire.

The system 100 can also transmit a communication or notification to an occupant, building operator, or emergency responder in response to detecting a change in ambient conditions within a room of a building and/or in response to detecting a change in fire classification of a detected fire in the building. In this implementation, the system 100 can: set a fire event flag at a first time; detect a first change in ambient temperature—via a temperature sensor in the system 100—from the first time to a second time; confirm the fire event flag as a fire event if the first change in ambient temperature exceeds a threshold temperature change; and then transmit a fire alarm to an emergency responder. In this implementation, the system 100 can also: detect an increase in ambient temperature—via the temperature sensor—to a third ambient temperature at a third time; and transmit a specification for additional heat protection to the emergency responder in response to the third ambient temperature exceeding a threshold ambient temperature. For example, after confirming a fire event based on an increase in ambient temperature from 72° F. to 81° F. over a period of two minutes, the system 100 can transmit a fire alarm to an emergency responder; if the system 100 subsequently detects an increase in ambient temperature greater than 169° F. (e.g., to a threshold ambient temperature of 250° F.), the system 100 can transmit a second communication to the emergency responder recommending additional heat protection equipment.

During a fire event, the system 100 can also correlate a decrease in light intensity with an increase in density of smoke near a light detector. In response to the calculated or estimated density of smoke exceeding a threshold smoke density, the system 100 can also transmit a specification for secondary oxygen supply to the emergency responder. The system 100 can thus monitor the fire event as the fire continues to burn and notify emergency responders when specific or additional protection or extinguishing equipment is required as a function of detected characteristics of the fire over the course of the fire event.

In one implementation, the system 100 selectively delays transmission of a fire alarm to an emergency responder based on a classification of the fire (and/or based on a detected size of the fire or rate of change of the fire). For example, the system 100 can automatically transmit a fire alarm to an emergency responder for fires characterized as developing and smoldering but can delay transmission of a fire alarm to an emergency responder for a limited period of time (e.g., 30 seconds) for a confirmed fire characterized as incipient. In this example, in response to confirmation of a fire, the system 100 can: automatically actuate a first audible siren at a first sound level; in response to confirmation of the fire as incipient, set a time for 30 seconds and maintain the first audible alarm; and, if the fire persists or is larger in size (e.g., if the light sensor detects the same or greater level of light intensity) at the expiration of the timer, actuate a second audible siren at a higher sound level and push a fire alarm to a remote responder. Furthermore, the system can set a delay time—between confirmation of a fire event and transmission of a fire alarm to an emergency responder—dynamically based on size and/or a rate of increase in fire intensity for an incipient fire. Therefore, for an incipient fire, the system 100 can audibly notify a person within the space of the fire with a lower-volume siren to permit the person to extinguish the incipient fire; if the fire is not extinguished or handled within a limited period of time, the system 100 can then automatically notify an emergency responder and issue a siren at a higher volume to ensure that persons within the space are notified of and leave the fire.

In the implementation described above in which the system 100 continues to monitor a fire after confirmation and transmission of a fire alarm to an emergency responder, the system 100 can also transmit fire classification, size, intensity, temperature, location, and/or other fire-related data to an emergency responder while a fire burns near the system 100. For example, the system 100 can stream both humidity, light intensity, temperature, and/or other raw sensor data and fire classifications to an emergency responder over a cellular or Wi-Fi connection. In another example, the system 100 can limit transmission of fire-related data to significant changes in the state of the fire, such as a change in the classification of the fire, a threshold change in the risk level of the fire on a risk scale, or a change in a protection equipment specification (e.g., due to detected changes in temperature or gas constituents within the space), etc. However, the system 100 can push any other type of raw or processed data to the emergency responder (or emergency responder dispatch, remote computer system, etc.) in any other frequency or according to any other communication schema.

The system 100 can additionally or alternatively upload raw sensor data to the remote computer system (e.g., a remote server), and the remote computer system can implement the foregoing methods and techniques to detect, confirm, classify, and/or monitor a fire event and to transmit a fire alarm and/or fire-related data to an emergency responder.

10. Virtual Map

Figure 7:
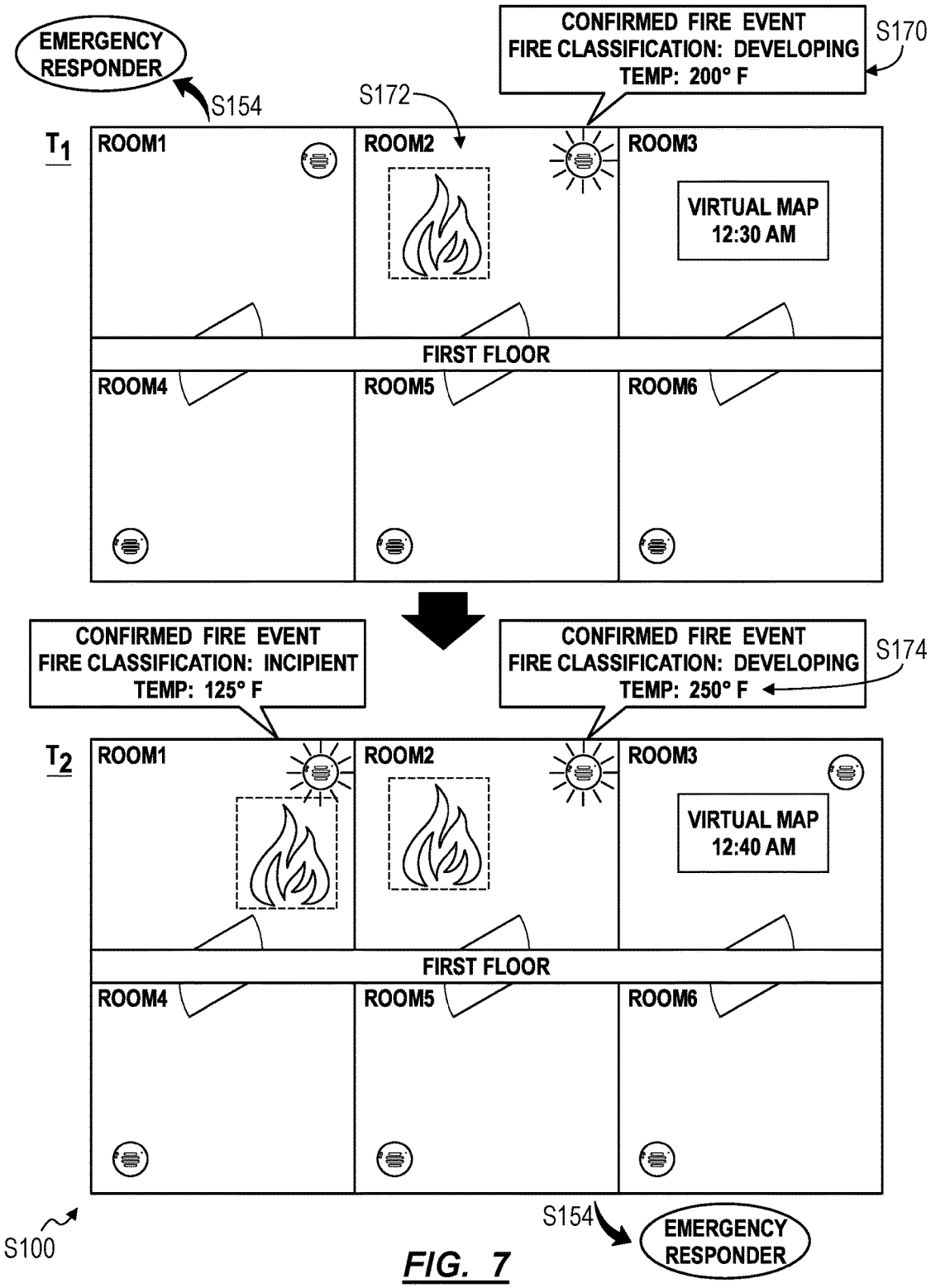
FIG. 7 is a flowchart representation of one variation of the method.

As shown in FIG. 7, one variation of the method S100 includes Block S170, which recites: generating a virtual map for a fire event, populating the virtual map with information pertaining to the fire event; transmitting the virtual map to an emergency responder; updating the virtual map as new information pertaining to the fire event is received; and transmitting an updated version of the virtual map to the emergency responder. Generally, in Block S170, the system 100 (or a remote computer system, such as a central controller within the building or a remote server in communication with the system 100) can generate a graphical representation (e.g., a virtual map) of the structure and a fire event detected within the structure; the system 100 can then serve the graphical representation to an emergency responder in order to assist the emergency responder in planning for and eventually responding to the fire event.

In one implementation, the system 100: accesses a digital floor plan (e.g., two-dimensional or three-dimensional engineering plan) of the building and a lookup table linking UUIDs of deployed units of the system 100 (and/or other sensing devices within the building, as described below) to specific rooms, areas, or volumes within the building; and then inserts (near) real-time information collected by these deployed units of the system 100 (and/or by other sensing devices) into a graphical representation of the floor plan to create a "virtual map" representing the current state of the building and one or more fire events detected within the building. The system 100 can then transmit the virtual map to a building operator or to an emergency responder in (near) real-time such as through building operator and emergency responder portals executing on corresponding computing devices.

Therefore, in this implementation, the system can generate a virtual map configured to assist a building operator or emergency responder in quickly ascertaining the current location, size, class, and/or state (and predicted future state) of one or more fire events within the building, thereby enabling the building operator or emergency responder to systematically address the fire event. For example, the system can populate the virtual map with visual representations of: fire events in various rooms throughout the building; a directionality of each fire event within the building; a classification of each fire event (e.g., nuisance, incipient, or developing) detected in each room of the building; a fire class of each fire event (e.g., Class A, B, C, D, or K); a composition of gaseous combustion products detected near each fire event in the building; a fire extinguishing equipment callout for each fire event; an ambient temperature in each room or area within the building; and/or a protection equipment specification for each fire event, etc.

In Block S172, the system 100 can assign a color to each fire classification, fire class, ambient temperature range, etc. and color areas of the virtual map or specific fire events within the virtual map with a representative color, as shown in FIG. 7. An emergency responder may thus ascertain a fire classification, fire class, and/or ambient temperature etc. of fires or volumes throughout the building based on colors of areas throughout the virtual map; the emergency responder can thus quickly identify and prioritize areas within the building requiring a most rapid response based on such data contained in the virtual map.

In this variation, a local controller or remote computer system can: generate or receive a fire event and a fire classification from a unit of the system 100 arranged within a structure; access a virtual map of the structure defining a known location of the unit of the system 100; label the known location of the unit within the virtual map with the fire event and the fire classification received from the fire detector; and transmit the virtual map to an emergency responder. For example, after detecting and confirming a fire event within a building, the local controller or remote computer system can: classify the fire event as a developing fire; populate a virtual map of the building with the location of the fire event and an indicator of a developing fire; and then transmit the virtual map—indicating the location and developing fire classification of the fire event—to an emergency responder driving to the building. The emergency responder may then use this information to develop a strategy for fighting the fire while in transit to the building.

In Block S174, the system 100 can regularly update the virtual map of the building throughout the fire event. For example, during the fire event, as the fire continues to burn, the status of the fire (e.g., its temperature, rate of growth, size, direction or spread, classification, and/or class, etc.) may change. The system 100 (or a local controller or remote computer system in communication with units of the system deployed throughout the building) can therefore update the virtual map with various raw or processed data pertaining to the fire event and transmit updated variants of the virtual map to a building operator, emergency responder, or other stakeholder throughout the fire event, such as on a regular interval of 1 Hz or once per 30-second interval. The system 100 (or the local controller or remote computer system in communication with units of the system deployed throughout the building) can therefore provide the building operator, emergency responder, or other stakeholder with a (near) real-time view of various statistics related to fire events within the building, which may aid these stakeholders in responding to and managing these fire events. For example, the local controller or remote computer system can regularly: receive a temperature value from a unit of the system 100 arranged in the building; label a known location of the unit within the virtual map with the temperature value received from the unit; and transmit the virtual map to an emergency responder in near real-time during the fire event.

The local controller or remote computer system can also populate the virtual map with a prediction of how a fire event may develop in the future. In this implementation, the system 100 can predict future states or characteristics of a fire event based on past data collected from units of the system deployed in the building. For example, after determining that a fire event detected by a unit of the system 100 is a developing, Class A fire, the local controller or remote computer system can predict—based on the developing fire classification and the Class A fire descriptor—that the fire event will likely increase in temperature until it reaches an ultimate ambient temperature of 1200° F. The system 100 can then transmit a notification to an emergency responder indicating that heat protection equipment necessary for a 1200° F. may be required. The system 100 can then depict the predicted ultimate temperature on the virtual map in the vicinity of the fire event. The local controller or remote computer system can similarly predict a future state of the fire event based on a fire template matched to fire-related data collected by a unit of the system 100, as described above. In another example, the local controller or remote computer system can: predict a future location and size of the fire event based on a direction of the fire event extrapolated from data collected over time through multiple units of the system 100 deployed throughout the building; and then insert these predictions into a virtual map served to the emergency responder.

9. Distributed Sensors

In one variation, the system 100 can be implemented at a building (e.g., a commercial or residential structure) with previously-installed sensing devices. For example, rooms and spaces within a commercial building may include: traditional fire detectors capable of detecting fire events based on presence of smoke; thermometers and humidity sensors connected to a central heating, ventilation, and air conditioning (or "HVAC") system in the building; and/or motion detectors (e.g., light-based motion detectors) connected to an occupant management and lighting system within the building. In this variation, Blocks of the method S100 can be executed by a local controller within the building or by a remote computer system to leverage these sensing devices to collect light, temperature, humidity, motion and/or data previously installed throughout the building. The local controller or remote computer system can thus routinely monitor rooms or spaces within the building for fire events based on these data streams imported from distributed sensors connected to one or multiple discrete sensor networks throughout the building. For example, in this variation, the local controller can be integrated into a building management system or a building automation system configured to monitors and control a building's mechanical, electrical, HVAC, and/or other equipment.

In one example, when executing the method S100, the local controller or remote computer system can interpret: an increase in light intensity detected by a motion sensor arranged in a room of the building and connected to a lighting system in the building; followed by an increase in temperature detected (in the same or nearby room or space) by a previously-installed thermometer connected to an HVAC system within the building as a possible fire event and issue a fire event flag accordingly. The local controller or remote computer system can then transmit a notification to a building operator indicating a possible fire event, as described above. In this example, the local controller or remote computer system can continue to monitor changes in humidity within or near this room or space through a previously-installed humidity sensor connected to the building's HVAC system. In response to detecting an increase in humidity, the local controller or remote computer system can transmit a notification to the building operator confirming the fire event, as described above.

In this variation, the local controller or remote computer system can access data from previously-installed sensing devices within the building via a wired or wireless network. The local controller or remote computer system can also identify a type of the sensing device (e.g., a fire detector, an HVAC sensor block, etc.), a type of sensor included in each sensing device (e.g., a temperature sensor, a light sensor, a moisture or humidity sensor, etc.), and/or a location of the sensing device within the building, such as based on identifiers (e.g., a UUIDs) contained in data packets received from each sensing device. The local controller or remote computer system can also: access a digital floor plan of the building; locate these previously-installed sensing devices within the digital floor plan; map types of sensing device, types of sensors integrated into each sensing device, and/or data streams received from these sensing devices to corresponding regions of the digital floor plan, such as based on a lookup table or name mapping system, to generate a virtual map of the building containing real-time statistics of rooms and spaces within the building.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for detecting a fire comprising:
at a first time, via a light sensor, detecting a change in ambient light intensity from an initial intensity to a first intensity, the first intensity exceeding the initial intensity by a threshold light intensity;
calculating a frequency of fluctuation in ambient light intensity;
in response to fluctuations in detected ambient light intensity remaining below a threshold magnitude and the frequency of fluctuation in ambient light intensity remaining below a threshold frequency following the first time, interpreting the change in ambient light intensity as an innocuous event; and
in response to fluctuations in detected ambient light intensity exceeding the threshold magnitude and the frequency of fluctuation in ambient light intensity exceeding the threshold frequency following the first time, interpreting the change in ambient light intensity as a fire event.

2. The method of claim 1, further comprising:
between the first time and a second time, detecting an increase in ambient humidity via a humidity sensor; and
in response to the increase in ambient humidity, confirming the fire event.

3. The method of claim 2, further comprising:
between the second time and a third time, detecting a decrease in ambient humidity via the humidity sensor;
calculating a time difference between the first time and the third time;
in response to the time difference falling below a low threshold time, classifying the fire event as a developing fire;
in response to the time difference exceeding the low threshold time and falling below a high threshold time, classifying the fire event as an incipient fire; and
in response to the time difference exceeding the high threshold time, classifying the fire event as a nuisance fire.

4. The method of claim 3, further comprising:
in response to interpreting the change in ambient light intensity as the fire event at approximately the first time, transmitting a first notification, indicating possibility of fire in a space occupied by the light sensor, to a building operator associated with a building comprising the space;
in response to confirming the fire event at approximately the second time, transmitting a fire alarm to an emergency responder; and
at approximately the third time, transmitting a third notification indicating a fire classification of the first event to the emergency responder.

5. The method of claim 1, wherein interpreting the change in ambient light intensity as the fire event comprises:
between the first time and a second time, detecting a change in ambient temperature via a temperature sensor arranged proximal the light sensor; and
in response to the change in ambient temperature exceeding a threshold temperature change:
confirming the fire event; and
transmitting a fire alarm to an emergency responder.

6. The method of claim 5, further comprising:
detecting a peak ambient temperature via the temperature sensor; and
in response to the second change in ambient temperature exceeding a threshold temperature, transmitting a specification for additional heat protection to the emergency responder.

7. The method of claim 1, further comprising:
between the first time and a second time, detecting a change in ambient temperature via a temperature sensor arranged in a space proximal the light sensor;
in response to the change in ambient temperature remaining below a low threshold temperature change, classifying the fire event as a nuisance fire;
in response to the change in ambient temperature between the first time and the second time exceeding a high threshold temperature change, classifying the fire event as a developing fire; and
in response to the change in ambient temperature between the first time and the second time remaining between the low threshold temperature change and the high threshold temperature change, classifying the fire event as an incipient fire.

8. The method of claim 7, further comprising:
in response to classifying the fire event as a nuisance fire, issuing a local fire alarm within the space;
in response to classifying the fire event as an incipient fire, transmitting a fire alarm to a building operator associated with a building comprising the space; and
in response to classifying the fire event as a developing fire, transmitting a fire alarm to an emergency responder.

9. The method of claim 1, further comprising:
between the first time and a second time, detecting an amplitude of motion in the space via a motion sensor arranged in a space proximal the light sensor;
in response to the amplitude of motion in the space falling below a low threshold amplitude, classifying the fire event as a nuisance fire;
in response to the amplitude of motion in the space exceeding the low threshold amplitude and falling below a high threshold amplitude, classifying the fire event as an incipient fire; and
in response to the amplitude of motion in the space exceeding the high threshold amplitude, classifying the fire event as a developing fire.

10. The method of claim 1:
wherein detecting the change in ambient light intensity comprises sampling light intensities from the light sensor integrated into a sensor block arranged in a fixed position within a space; and
wherein interpreting the change in ambient light intensity as the fire event comprises, at the sensor block, interpreting the change in ambient light intensity as the fire event within the space in response to fluctuations in detected ambient light intensity exceeding the threshold magnitude and the frequency of fluctuation in ambient light intensity exceeding the threshold frequency following the first time.

11. The method of claim 1, wherein interpreting the change in ambient light intensity as the innocuous event comprises:
in response to fluctuations in detected ambient light intensity remaining below the threshold magnitude and the frequency of fluctuation in ambient light intensity falling between the threshold frequency and a low threshold frequency following the first time, interpreting the change in ambient light intensity as actuation of a local artificial light source; and in response to fluctuations in detected ambient light intensity remaining below the threshold magnitude and the frequency of fluctuation in ambient light intensity falling below the low threshold frequency following the first time, interpreting the change in ambient light intensity as a local natural light change.

12. The method of claim 1, further comprising:

between the first time and a second time, detecting an increase in light intensity via the light sensor;

from the second time to a third time, detecting a decrease in light intensity via the light sensor;

in response to detecting the increase in light intensity between the first time and the second time and the decrease in light intensity from the second time to the third time, confirming the fire event; and in response to confirming the fire event, transmitting a fire alarm to an emergency responder.

13. The method of claim 12, further comprising:

estimating densities of smoke obscuring a field of view of the light sensor inversely proportional to light intensities detected by the light sensor between the second time and the third time; and in response to a density of smoke, estimated based on a light intensity detected by the light sensor, exceeding a threshold smoke density, transmitting a prompt for oxygen support to the emergency responder.

14. A method for detecting a fire comprising:

at a first time, via a light sensor, detecting a change in ambient light intensity from an initial intensity to a first intensity, the first intensity exceeding the initial intensity by a threshold light intensity; calculating a frequency of fluctuation in ambient light intensity;

in response to the frequency of fluctuation in ambient light intensity exceeding a threshold frequency following the first time, interpreting the change in ambient light intensity as an innocuous event;

in response to the frequency of fluctuation in ambient light intensity exceeding the threshold frequency following the first time, interpreting the change in ambient light intensity as a fire event proximal the light sensor; from the first time to a second time, detecting an increase in ambient humidity via a humidity sensor arranged proximal the light sensor; from the first time to the second time, detecting an increase in ambient temperature via a temperature sensor arranged proximal the light sensor; and in response to detecting the increase in ambient humidity and the increase in ambient temperature, confirming the fire event.

15. The method of claim 14: wherein interpreting the change in ambient light intensity as the fire event proximal the light sensor comprises interpreting the change in ambient light intensity as the fire event proximal the light sensor further in response to fluctuations in detected ambient light intensity exceeding a threshold magnitude; and wherein interpreting the chance in ambient light intensity as an innocuous event further comprises, in response to the frequency of fluctuation in ambient light intensity remaining below the threshold frequency and fluctuations in detected ambient light intensity remaining below the threshold magnitude following the first time.

16. The method of claim 14, further comprising:

between the second time and a third time, detecting a decrease in ambient humidity via the humidity sensor;

calculating a time difference between the first time and the third time;

in response to the time difference falling below a low threshold time, classifying the fire event as a developing fire;

in response to the time difference exceeding the low threshold time and falling below a high threshold time, classifying the fire event as an incipient fire; and in response to the time difference exceeding the high threshold time, classifying the fire event as a nuisance fire.

17. The method of claim 14, further comprising:

in response to the increase in ambient temperature remaining below a low threshold temperature change, classifying the fire event as a nuisance fire;

in response to the increase in ambient temperature between the first time and the second time exceeding a high threshold temperature change, classifying the fire event as a developing fire; and in response to the increase in ambient temperature between the first time and the second time remaining between the low threshold temperature change and the high threshold temperature change, classifying the fire event as an incipient fire.

* * * * *